US010439926B2

(12) United States Patent
Horn et al.

(10) Patent No.: US 10,439,926 B2
(45) Date of Patent: Oct. 8, 2019

(54) NETWORK ANALYSIS

(71) Applicant: FUJITSU LIMITED, Kawasaki-shi, Kanagawa (JP)

(72) Inventors: Alexander Horn, Sunnyvale, CA (US); Ali Kheradmand, Urbana, IL (US)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 15/860,558

(22) Filed: Jan. 2, 2018

(65) Prior Publication Data

US 2019/0207843 A1 Jul. 4, 2019

(51) Int. Cl.
*G06F 15/16* (2006.01)
*H04L 12/751* (2013.01)
*H04L 29/12* (2006.01)
*H04L 12/24* (2006.01)

(52) U.S. Cl.
CPC .............. *H04L 45/02* (2013.01); *H04L 41/14* (2013.01); *H04L 61/6018* (2013.01)

(58) Field of Classification Search
CPC ...................................................... H04L 45/02
USPC ........................................................ 709/224
See application file for complete search history.

(56) References Cited

U.S. PATENT DOCUMENTS 9,639,575 B2 * 5/2017 Leida ................ G06F 16/24534
2011/0264432 A1* 10/2011 Penner ................... G16C 20/80
703/11

2014/0369209 A1* 12/2014 Khurshid ............ H04L 41/0866
370/250
2018/0351845 A1* 12/2018 Horn ................... H04L 41/0873
2019/0116112 A1* 4/2019 Horn ....................... H04L 45/02

OTHER PUBLICATIONS

U.S. Appl. No. 15/264,501, filed Sep. 13, 2016.
U.S. Appl. No. 15/610,590, filed May 31, 2017.
Ball, T., Bjørner et al., "VeriCon: Towards verifying controller programs in software-defined networks." in PLDI (Jun. 9, 2014).
Beckett,R.,Zou,X.K.,Zhang,S.,Malik,S.,Rexford, J., and Walker, D. "An assertion language for debugging SDN applications." In HotSDN (Aug. 22, 2014).

(Continued)

*Primary Examiner* — Hamza N Algibhah
(74) *Attorney, Agent, or Firm* — Maschoff Brennan

(57) ABSTRACT

A network analysis method may include identifying a data plane for routing traffic through a network that includes one or more forwarding tables for each switch of a plurality of switches in the data plane. The method may also include generating an edge-labeled graph, wherein each edge of the edge-labeled graph is associated with one or more atoms to represent an Internet Protocol (IP) prefix of a forwarding rule of the data plane. Further, the method may include initializing a network summary of the network as a transitive closure of the edge-labeled graph. In addition, the method may include updating the edge-labeled graph to generate an updated edge-labeled graph in response to a modification of a forwarding table of the one or more forwarding tables. Moreover, the method may include determining a transitive closure of the updated edge-labeled graph, and updating the network summary based on the network summary and the transitive closure of the updated edge-labeled graph.

20 Claims, 16 Drawing Sheets

(56) References Cited

OTHER PUBLICATIONS

Canini, M. et al., "A NICE way to test openflow applications." In NSDI (Apr. 25, 2012).
Fayaz, S. K., and Sekar, V., "Testing stateful and dynamic data planes with FlowTest." In HotSDN (Aug. 22, 2014).
Fayaz, S. K., Yu, T., Tobioka, Y., Chaki, S., and Sekar, V. Buzz, "Testing context-dependent policies in stateful networks." In NSDI (Mar. 16, 2016).
Stoenescu, R., Popovici, M., Negreanu, L., and Raiciu, C., "SymNet: Scalable symbolic execution for modern networks." In SIGCOMM (Apr. 11, 2016).
Velner, Y., Alpernas, K., Panda, A., Rabinovich, A., Sagiv, M., Shenker, S., and Shoham, S., "Some complexity results for stateful network verification." In TACAS (Apr. 2, 2016).
Al-Shaer, E., and Al-Haj, S., "FlowChecker: Configuration analysis and verification of federated OpenFlow Infrastructures." In SafeConfig (Oct. 4, 2010).
Bjørner, N., Juniwal, G., Mahajan, R., Seshia, S. A., and Varghese, G., "ddNF: An efficient data structure for header spaces." Tech. rep., Microsoft Research, Aug. 8, 2016.
Fogel, A., Fung, S., Pedrosa, L., Walraed-Sullivan, M., Govindan, R., Mahajan, R., and Millstein, T., "A general approach to network configuration analysis." In NSDI (May 4, 2015).
Gember-Jacobson, A., Viswanathan, R., Akella, A., and Mahajan, R., "Fast control plane analysis using an abstract representation." In SIGCOMM (Aug. 22, 2016).
Jayaraman, K., Bjørner, N., Outhred, G., and Kauf-Man, C., "Automated analysis and debugging of network connectivity policies." Tech. rep., Microsoft Research, Jul. 26, 2014.
Jeffrey, A., and Samak, T., "Model checking firewall policy configurations." In POLICY (Jul. 20, 2009).
Kazemian, P., Chang, M., Zeng, H., Varghese, G., McKeown, N., and Whyte, S., "Real time network policy checking using header space analysis." In NSDI (Apr. 2, 2013).
Kazemian, P., Varghese, G., and McKeown, N., "Header space analysis: Static checking for networks." In NSDI (Apr. 25, 2012).
Khurshid, A., Zou, X., Zhou, W., Caesar, M., and God-Frey, P. B., "VeriFlow: Verifying network-wide invariants in real time." In NSDI (Aug. 13, 2013).
Lopes, N. P., Bjørner, N., Godefroid, P., Jayaraman, K., and Varghese, G., "Checking beliefs in dynamic networks." In NSDI (May 6, 2015).
Mai, H., Khurshid, A., Agarwal, R., Caesar, M., God-Frey, P. B., and King, S. T., "Debugging the data plane with Anteater." In SIGCOMM (Aug. 15, 2011).
Maldonado-Lopez, F. A., Calle, E., and Donoso, Y . . . "Detection and prevention of firewall-rule conflicts on software-defined networking." In RNDM (Oct. 5, 2015).
Nelson, T., Barratt, C., Dougherty, D. J., Fisler, K., and Krishnamurthi, S., "The Margrave tool for firewall analysis." In LISA (Nov. 7, 2010).
Son, S., Shin, S., Yegneswaran, V., Porras, P. A., and Gu, G., "Model checking invariant security properties in Open-Flow." In ICC (Jun. 9, 2013).
Xie, G. G., Zhanm, J., Maltz, D. A., Zhang, H., Green-Berg, A., Hjalmtysson, G., and Rexford, J., "On static reachability analysis of IP networks." In INFOCOM (Mar. 13, 2005).
Yang, H., and Lam, S. S., "Real-time verification of network properties using atomic predicates." In ICNP (Oct. 7, 2013).
Yuan, L., Mai, J., Su, Z., Chen, H., Chuah, C.-N., and Mohapatra, P. Fireman, "A toolkit for firewall modeling and analysis." In SP (May 21, 2006).

\* cited by examiner

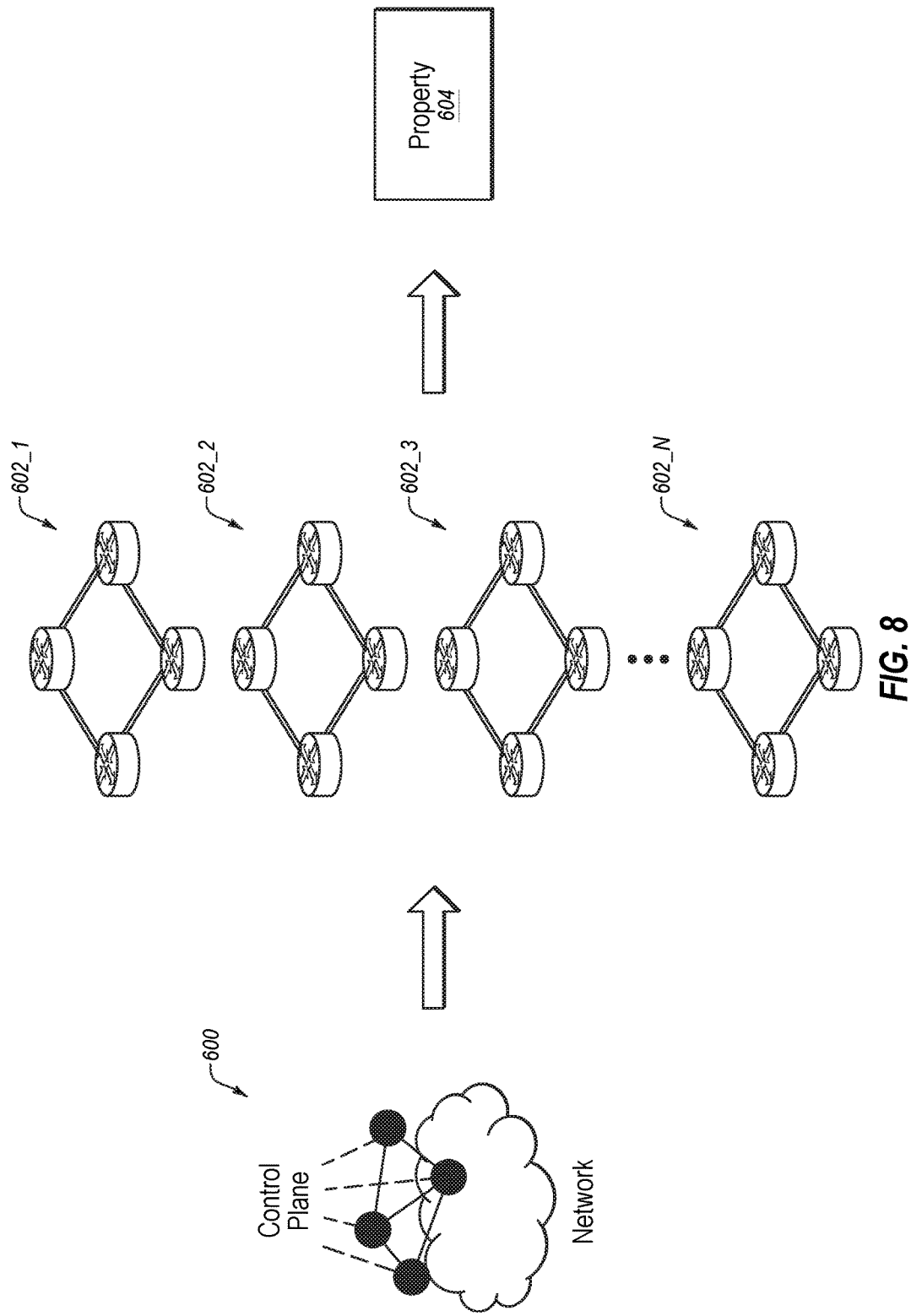

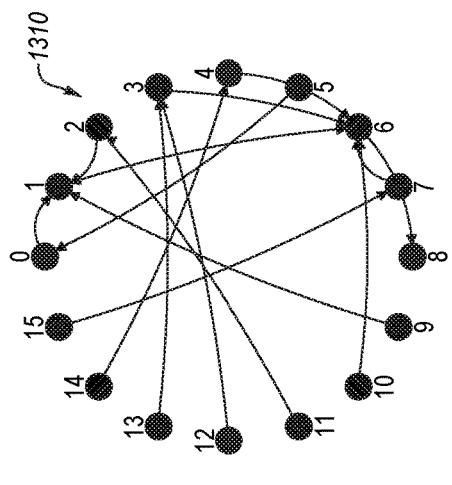
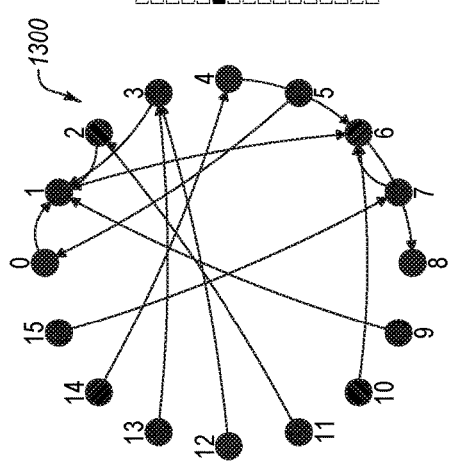
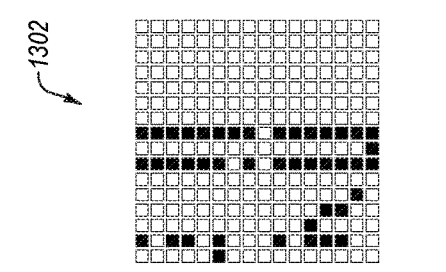
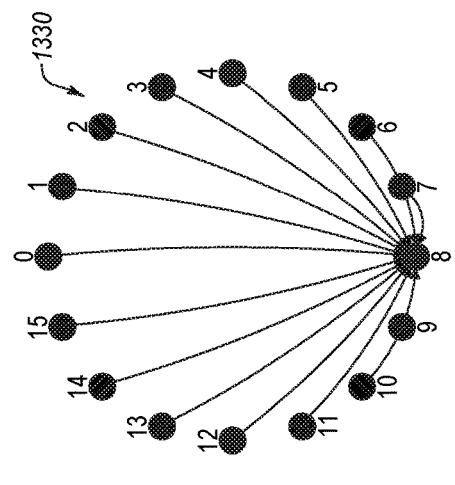
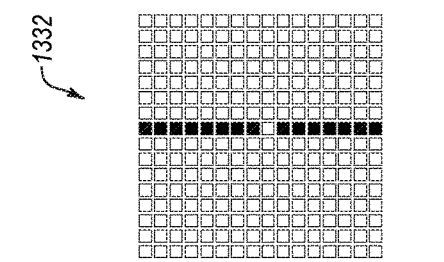
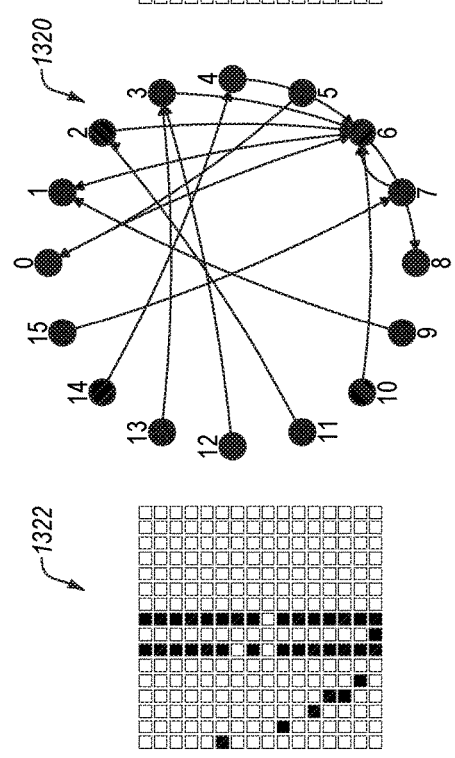
FIG. 13A  FIG. 13B  FIG. 13C  FIG. 13D

NETWORK ANALYSIS

FIELD

The embodiments discussed herein relate to network analysis.

BACKGROUND

A software-defined network (SDN) may include a series of network objects (e.g., switches, routers, firewalls), which may be automated via commercial or open source tools customized according to one or more requirements (e.g., requirements of a network administrator). Network functions virtualization (NFV) includes moving network functions (e.g., functions performed by routers, firewall, load balancers), which are performed by dedicated hardware, into a virtualized environment.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a network analysis method. The method may include identifying a data plane for routing traffic through a network that includes one or more forwarding tables for each switch of a plurality of switches in the data plane. The method may also include generating an edge-labeled graph, wherein each edge of the edge-labeled graph is associated with one or more atoms to represent an Internet Protocol (IP) prefix of a forwarding rule of the data plane. Further, the method may include initializing a network summary of the network as a transitive closure of the edge-labeled graph. In addition, the method may include updating the edge-labeled graph to generate an updated edge-labeled graph in response to a modification of a forwarding table of the one or more forwarding tables. Moreover, the method may include determining a transitive closure of the updated edge-labeled graph, and updating the network summary based on the network summary and the transitive closure of the updated edge-labeled graph.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIG. 8 is an illustration including a control plane, a plurality of data plane snapshots, and a network property;

FIGS. 13A-13D depict simulation results for an example network; and

DESCRIPTION OF EMBODIMENTS

Communication networks may include multiple switches that may route packets of information to different elements of the networks based on forwarding rules that apply to each switch. In some instances, the forwarding rules may correspond to network addresses that may be included in the packets in that certain rules may correspond to certain network addresses that are within a specific address range.

Although communication networks may change frequently (e.g., due to failures, changes by network operators, etc.), there may be one or more inherent invariant properties that may be maintained by the network. In some networks, defining and/or articulating network properties may be difficult. The present disclosure relates to analyzing a network's forwarding behavior (e.g., via capturing and analyzing a plurality of data plane snapshots) over time to determine at least one invariant property. The at least one invariant property may be indicative of overall network behavior and/or an intent of the network.

As used herein, the term "data plane" may refer to communications and connections used in the transmission and reception of data through the network, and may include the actual physical connections available within the network. As used herein, the term "control plane" may refer to communications and connections used in the control and administration of a network itself, rather than the transmission of data through the network, which may occur at the data plane. For example, the control plane may include administrative traffic directed to a network device within a network, while the data plane may include traffic that passes through network devices within the network.

In an ever-increasing interconnected world, network traffic is increasingly diverse and demanding, ranging from communication between small everyday devices to larges-cale data centers. This diversity has driven the design and rapid adoption of new open networking architectures, built on programmable network switches, which make it possible to separate the control plane from the data plane.

Figure 6:
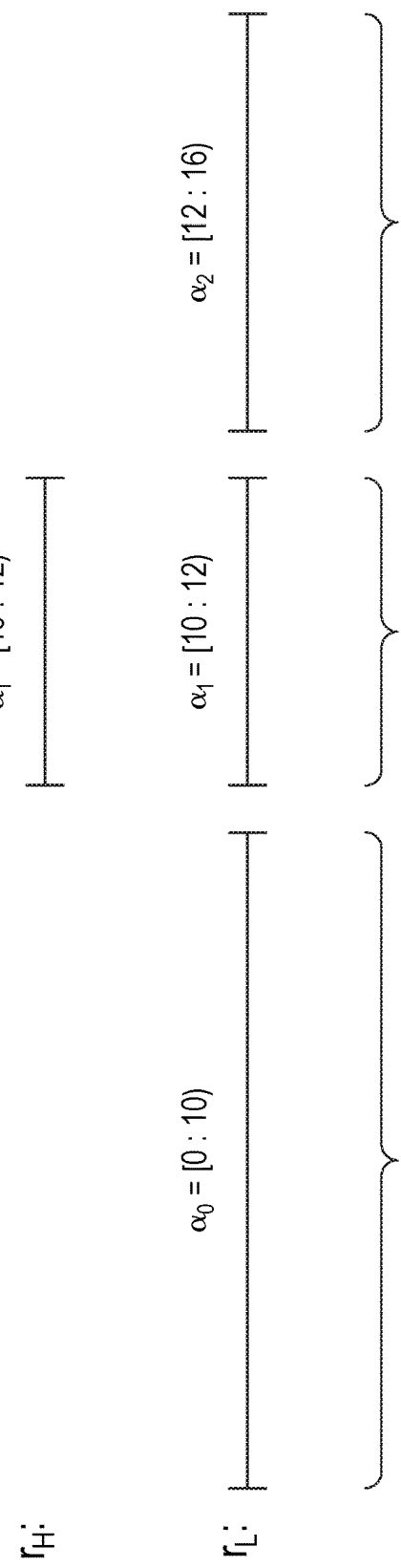
FIG. 6 depicts example atoms for various forwarding rules.
Figure 7:
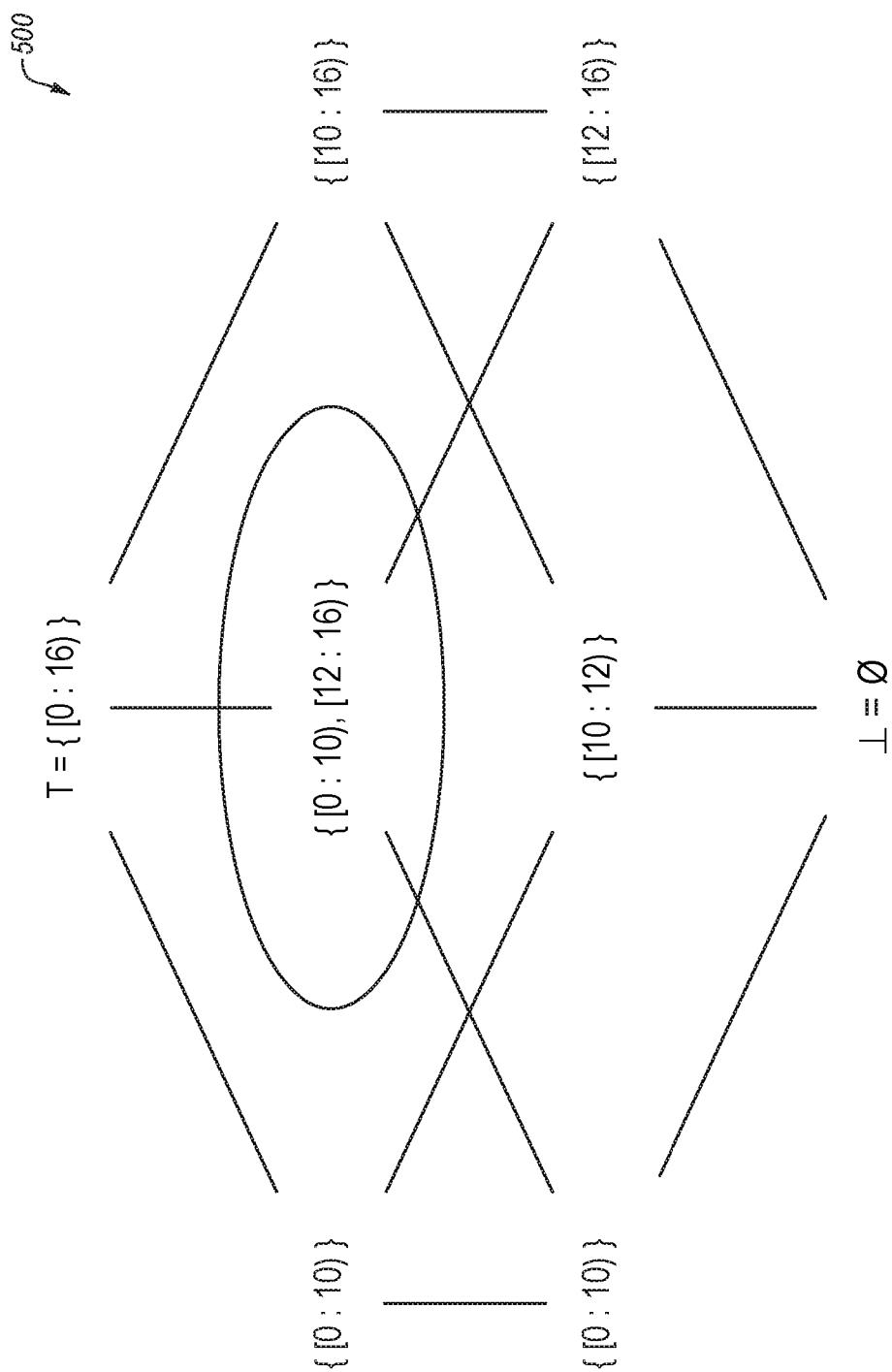
FIG. 7 illustrates an example Hasse diagram.

A forwarding rule (typically referred to using the variable r in the present disclosure) may indicate for a given network switch where a packet or set of packets should be physically forwarded to. For example, a forwarding rule may indicate that a group of network packets within a range of network addresses identified by an IP prefix are to be routed from a first receiving network switch to a destination network switch. Additionally or alternatively, a forwarding rule may include a priority associated with that rule, such that if two rules for a switch cover the same or overlapping ranges (e.g., as illustrated in FIG. 6), the switch will know which rule to follow when forwarding a packet within the range. An example of a forwarding rule may be described with reference to FIG. 2.

In some embodiments, rather than representing each network forwarding rule independently, a forwarding rule may be represented by one or more half-intervals, referred to as atoms, representing distinct portions of address ranges. The set of all atoms may represent all possible address ranges. Atoms may have a forwarding rule that "owns" a particular atom, meaning that the owning rule is the highest priority rule for the range of network addresses of that atom on a given switch in the network. As forwarding rules are introduced or removed, the representation of the forwarding rules may be adjusted or modified by creating any new atoms that are needed based on the address range covered by the rule, and updating or verifying the current ownership information for each atom that covers an address range affected by the forwarding rule being added or removed. In these and other embodiments, the representation may be used to perform network analysis.

According to various embodiments, as described more fully below, network analysis may include automatically refining a lattice-theoretical domain to represent flows of all packets in a network as an edge-labeled graph, which may represents the global packet forwarding behavior of every packet in an entire network. A lattice-theoretical domain may include a well-founded approximation or representation of the flow of packets in a network using lattice theory-based elements (e.g., ordered groups). More specifically, instead of constructing multiple forwarding graphs for representing the flow of packets in a network, embodiments of the present disclosure may include transforming a single edge-labeled graph that is a representation of the network forwarding rules. The edge-labeled graph may be transformed by incrementally maintaining the lattice-theory based concept of atoms, which may represent Boolean combinations of forwarding rules in a network. For example, an atom may represent a numerical range of network addresses that are handled the same, for example, all or a portion of an IP prefix. A further explanation of atoms may be included with reference to FIGS. 3A-3C.

According to some embodiments, the graph may represent all Boolean combinations of forwarding rules in a network, or in other words, all potential combinations of 0's and 1's (all Boolean combinations) for a numerical representation of IP address ranges may be covered by the atoms. Additionally or alternatively, in some embodiments, the representation may include one or more Patricia trees, for example, the forwarding rules for each node or switch in a network may be represented by a Patricia tree.

An example of the use of such atoms in representing a network and verifying properties of such a network is disclosed in U.S. application Ser. Nos. 15/264,501 and 15/610,590, which are hereby incorporated by reference in their entireties.

Further, according to various embodiments, a transitive closure (e.g., the fully dynamic transitive closure (FDTC)) of an edge-labeled atom graph may be determined (e.g., computed and/or generated). Moreover, an intersection for each computed transitive closure (e.g. FDTC) may be used to determine an invariant property of the network. In at least some embodiments, a network summary can be inferred using a variety of packet equivalence classes (PECs), examples of which being header space analysis (HSA) cubes and Delta-net atoms.

Embodiments of the present disclosure are now explained with reference to the accompanying drawings.

Figure 1:
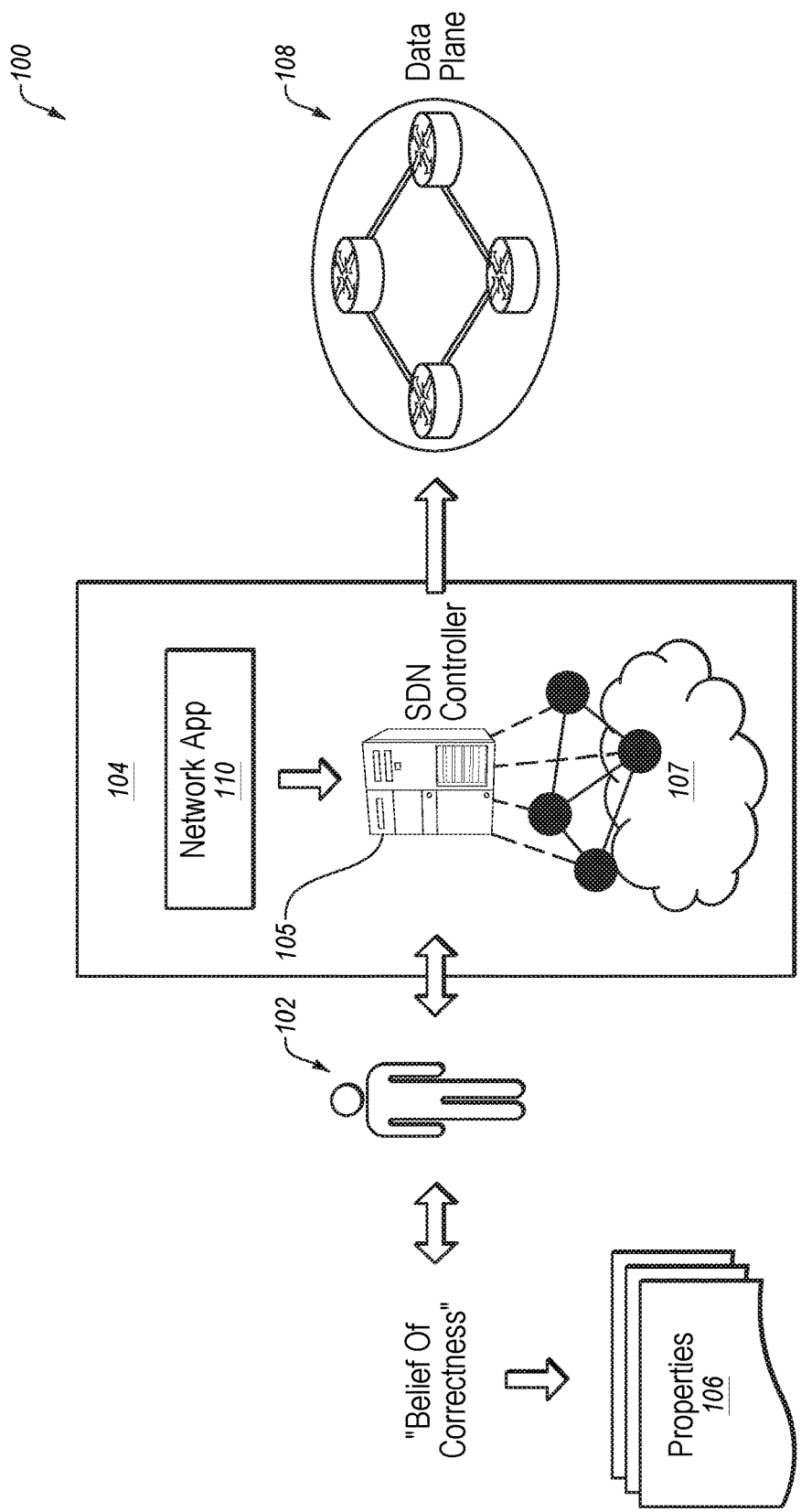
FIG. 1 illustrates an example system that may be used for network analysis.

FIG. 1 illustrates system 100 that may be used in a network analysis process. System 100 includes a network administrator 102, a software-defined network (SDN) 104, properties 106, and a data plane 108. SDN 104 may include an SDN controller 105, a physical network 107, which may include data plane 108, and a network application 110.

Properties 106 may include, for example, one or more network-wide invariants, which may be defined by network administrator 102 for reaching one or more goals. For example, the one or more network-wide invariants may include a one or more "reachability invariants." A reachability invariant may include a network destination that may be designed to be always reachable from a first location. Other "invariant" network properties may include any network property that is configured to be reliable, unchanging, or available. For example, with the utilization of other meta-data other invariant network properties may be confirmed or otherwise analyzed.

A control plane of system 100 may include SDN controller 105 and network application 110. A data plane (e.g., data plane 108) of system 100 may include a snapshot of a configuration of various network switches and/or physical connections in SDN 104 at a given time. As described above, the control plane may facilitate management and/or control of SDN 104, and data plane 108 may facilitate the transmission of customer data through SDN 104. For example, the solid circles of the physical network 107 may correspond to the switches within data plane 108. Additionally or alternatively, data plane 108 may include one or more virtualized network devices.

During operation of a network, an event (e.g., failure events (e.g., node, links), traffic events (e.g., feedback from devices to controller, additional/expiration of connection requests), etc.) may cause SDN controller 105 to modify data plane 108. For example, a new network switch may be brought up in physical network 107, or a physical link between two network devices may suffer a mechanical failure. As an additional example, a physical network switch may have a hardware or software failure. As another example, performance on a particular network link between two physical network devices may be analyzed and found to be below a threshold.

In some embodiments, SDN controller 105 may perform network analysis and/or verification (e.g., as described in one or more of FIGS. 2-12). Additionally or alternatively, some other component of system 100 may perform network analysis and/or verification. For example, SDN controller 105 may identify (e.g., capture) multiple (e.g., consecutive) data plane snapshots (e.g., due to network changes due to, for example, link and/or node failures, and/or as an network operator/SDN controller performs traffic engineering tasks) that may be captured over time. Further, based on the data plane snapshots, SDN controller 105 may determine a network summary. For example, the network summary may be indicative of one or more network invariants.

Figure 14:
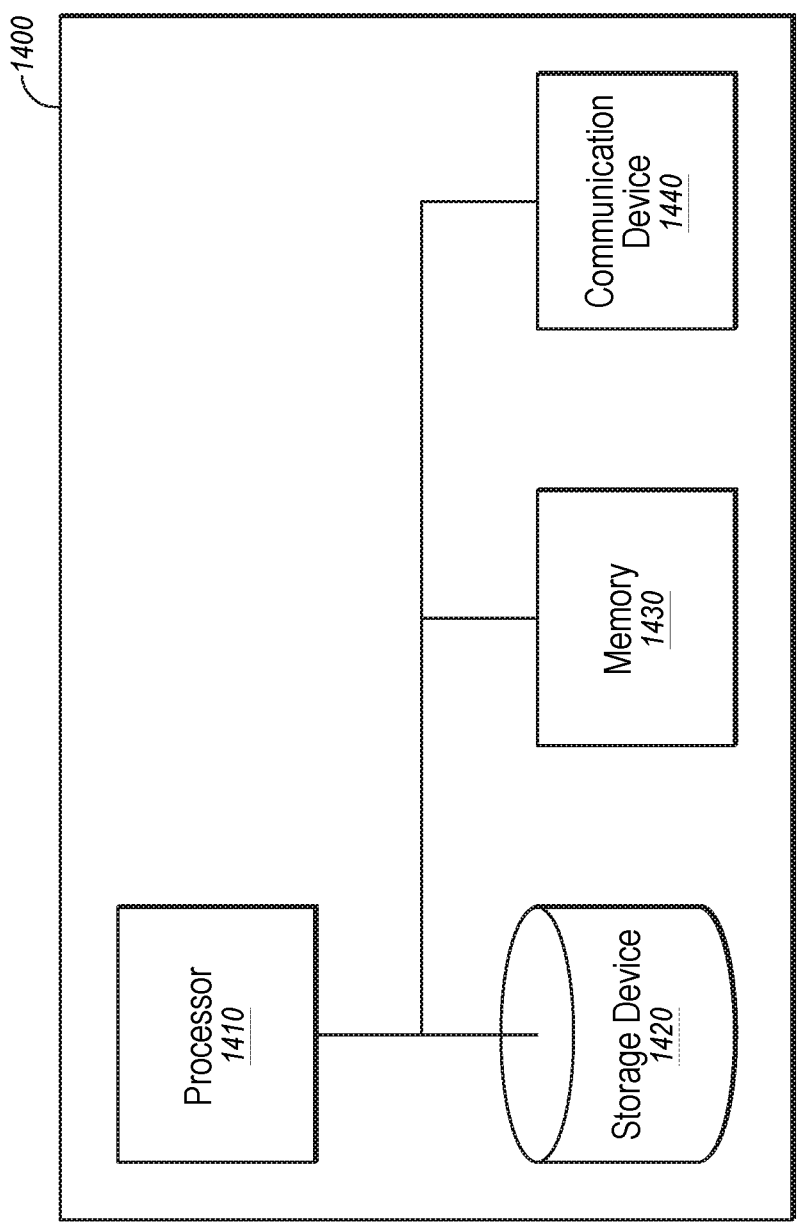
FIG. 14 is a block diagram of an example computing system.

SDN controller 105 may be implemented as an embodiment of a system 1400 of FIG. 14, or as a virtualized machine running on a system, such as system 1400 of FIG. 14.

Figure 2:
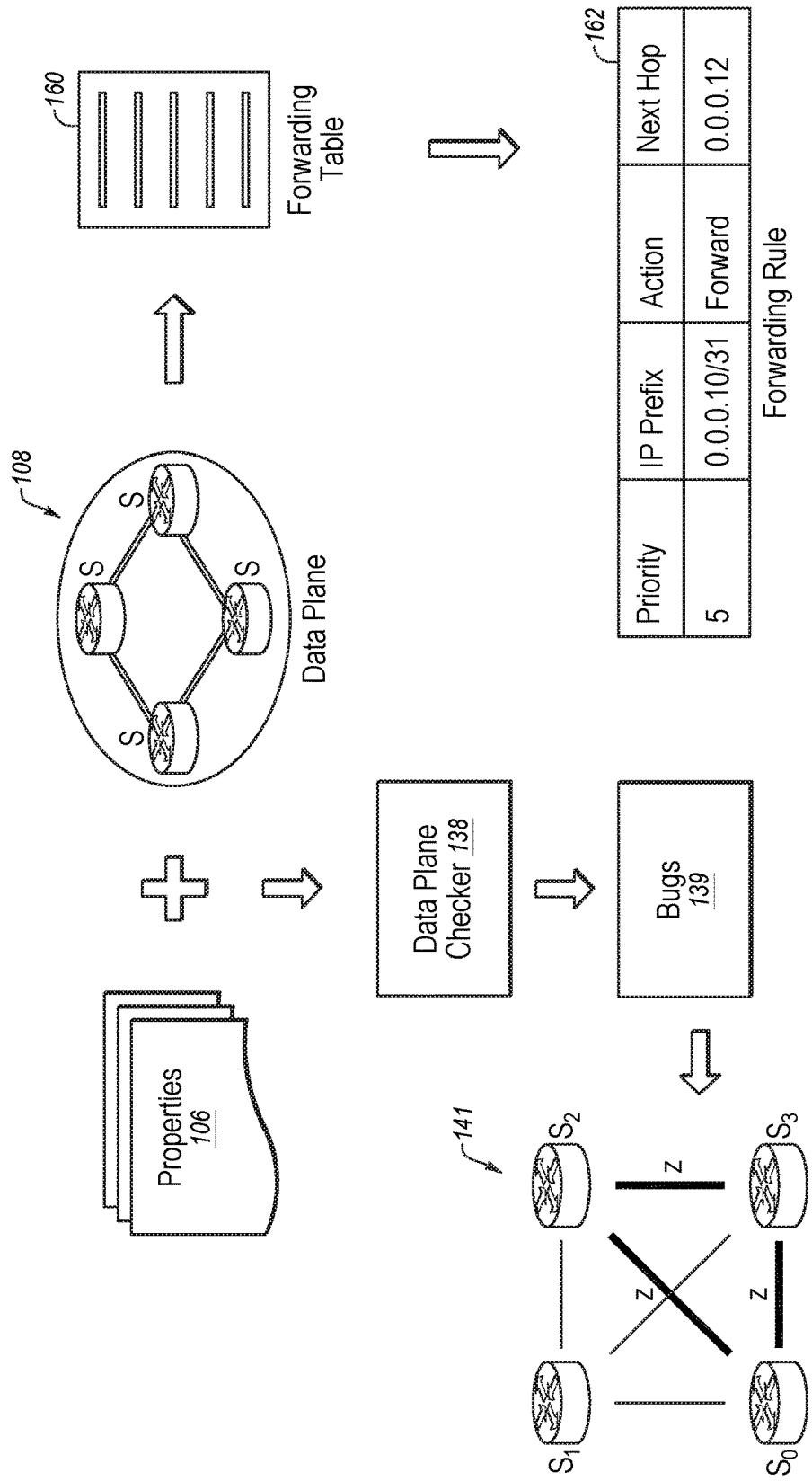
FIG. 2 depicts example components that may be used for network analysis and verification.

FIG. 2 depicts properties 106 and data plane 108. Properties 106 and data plane 108 may be similar or comparable to properties 106 and data plane 108 of FIG. 1. Data plane 108 may include one or more switches, designated by the letter S. Each switch may be implemented physically as system 1400 of FIG. 14. Additionally, it will be appreciated that while the term "switch" is used, the term also contemplates a router, a hub, or any other network device.

Each switch S in data plane 108 may include one or more forwarding tables 160, which may include one or more forwarding rules, such as example forwarding rule 162. The forwarding rules of forwarding table 160 may provide instructions of how received packets should be routed through the network. For example, with reference to forwarding rule 162, packets received at a switch with forwarding rule 162 may check whether the IP address within the packets (e.g., the destination IP address, the source IP address, other IP addresses, or combinations thereof) falls within the range of addresses defined by the IP prefix associated with the rule. For example, the IP prefix "0.0.0.10/31" may be equivalent to the 32-bit sequence (4 bytes separated by dots) that starts with all zeros and ends with 101* (the binary representation of the numeral 10) where * denotes an arbitrary bit. Similarly, the IP prefix "0.0.0.0/28" may be equivalent to the 32-bit sequence starting with zeroes with four arbitrary bits at the end, e.g., 0 . . . 0****. Thus, forwarding rule 162 may be potentially invoked for IP packets with the address with the numerical representation 0 . . . 01010 and 0 . . . 01011. If such a packet were received at the packet the action "forward" would be taken to forward the packet to the next hop address of 0.0.0.12.

In some embodiments, the switch may identify the next hop address with a particular MAC address, a particular port, or some other forwarding mechanism. Additionally, forwarding rule 162 may include a priority, such as Priority 5. The priority information may designate a relative level of importance as compared to other rules, such that the highest priority rule should be handled first. For example, if a second rule were also in forwarding table 160 with a lower priority than forwarding rule 162 that covered some of the same potential numerical range, a packet that fell within both ranges would be handled by the highest priority rule.

FIG. 2 further depicts a data plane checker 138, which may be configured to detect one or more bugs 139. For example, data plane checker 138 may include a suitable data plane checker, such as an HSA data plane checker, a Veriflow data plane checker, and/or a delta-net data plane checker. As an example, a bug may include an undesirable forwarding loop, as depicted by reference numeral 141. For example, a packet may enter an infinite forwarding loop between the switches $S_0$ and $S_2$ and $S_3$ such that a reachability query fails, or such that an invariant is not met. Data plane checker 138 may include a program or set of operations operating on a computing system (e.g., system 1400 of FIG. 14). In some embodiments, data plane checker 138 may be implemented by SDN controller 104 of FIG. 1.

As described herein, an IP prefix may be divided into subranges of IP addresses. A pair-wise intersection of these subranges is an empty set (e.g., the IP prefix subranges are disjoint). Furthermore, the union of all subranges of IP addresses may be equal to the shortest IP prefix (i.e., 0.0.0.0/0 in the case of 32-bit IPv4 addresses). Each such disjoint subrange of IP addresses is referred to as an "atom" (e.g., denoted a).

Figure 3A:
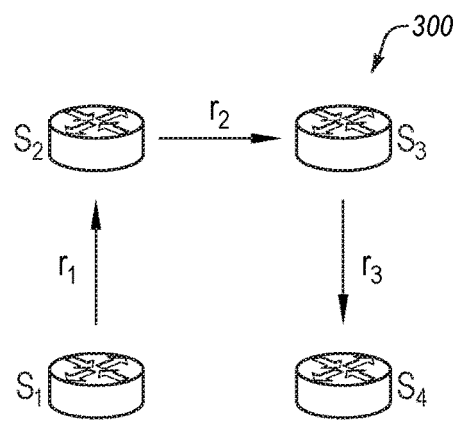
FIG. 3A illustrates an example forwarding graph.
Figure 3B:
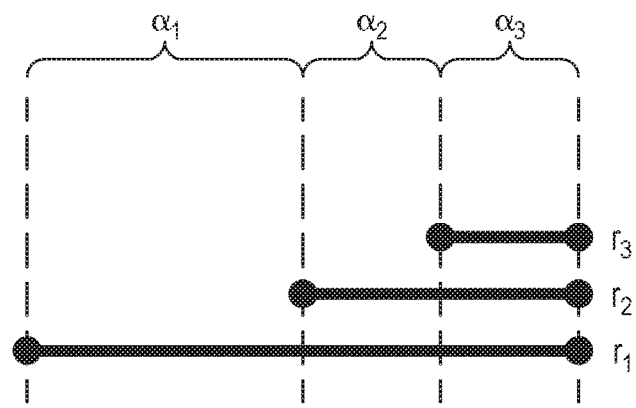
FIG. 3B depicts example intervals for various forwarding rules.
Figure 3C:
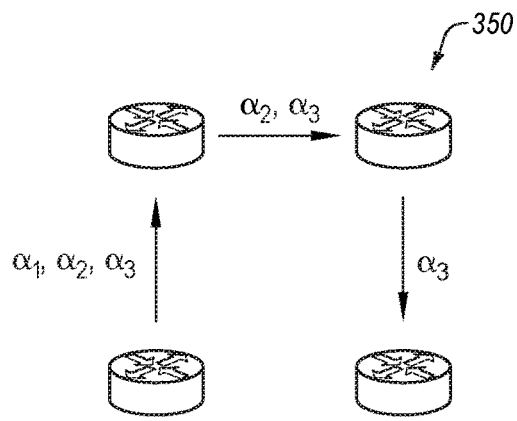
FIG. 3C illustrates an example edge-labeled graph.

FIGS. 3A-3C introduce and provide examples of atoms. As used herein, an "atom" may refer to a range of network addresses, or numerical representations of network addresses, and may be represented as half-closed intervals. A half-closed interval may include an interval (e.g., a set of numbers in a range) that includes only one of the terminal numbers. For example, one example of a half-closed interval includes 5≤x<8, and may be depicted as [5, 8) where the square bracket indicates the end point number is included and the rounded parenthesis indicates the end point is excluded. Using the example IP prefix of "0.0.0.10/31," the prefix may be represented by the half-closed interval [0 . . . 01010: 0 . . . 01100).

FIG. 3A depicts an example forwarding graph 300 of a network including switches $S_1$-$S_4$ and rules $r_1$-$r_3$ that may be generated based on the forwarding rules of the switches $S_1$-$S_4$. A collection of IP prefixes in the network may be represented by the atoms (e.g., the network addresses ranges depicted by half-closed intervals). Additional examples of atoms and an associated description may be described with reference to FIGS. 5-7. By using atoms, the set of all atoms for the network may form a family of sets of network packets (e.g., each atom may represent a group of potential IP packets), such that Boolean combinations of rules in an entire network may be represented (e.g., all potential combinations of 0s and 1s for potential numerical representations of IP addresses, and therefore all sets of packets, may be included in the set of all atoms). In these and other embodiments, as described with respect to FIGS. 3B and 3C, a set of atoms may represent an IP prefix, for example, the range of addresses included in an IP prefix may span one or more atoms.

FIG. 3B depicts spans of ranges of addresses that are affected by rules $r_1$, $r_2$, and $r_3$. As shown in FIG. 3B, a range of addresses for rule $r_1$ includes atoms $\alpha_1$, $\alpha_2$, and $\alpha_3$, where each atom depicts a range of numerical addresses. The range of addresses for rule $r_2$ includes the atoms $\alpha_2$ and $\alpha_3$, and the range of addresses for rule $r_3$ includes the atom $\alpha_3$. Stated another way, of the depicted rules, the rule $r_1$ covers the broadest range of addresses, including the ranges associated with all three atoms, the rule $r_2$ covers the next broadest range of addresses, being applicable to the packets with addresses that fall within the ranges covered by the atoms $\alpha_2$ and $\alpha_3$, and the rule $r_3$ covers the narrowest range of addresses, only affecting those addresses that fall within the range of $\alpha_3$.

FIG. 3C depicts a single edge-labeled graph 350, which may be a visual example of the forwarding rule representation within the network. For example, rule $r_1$ serves to forward packets from switch $S_1$ to switch $S_4$ and affects addresses within the range covered by the atoms $\alpha_1$, $\alpha_2$, $\alpha_3$, and thus the link from switch $S_1$ to switch $S_2$ is labeled with all three atoms affected by the rule. Additionally, the rule $r_2$ serves to forward packets from switch $S_2$ to switch $S_3$ and affects addresses within the range covered by the atoms $\alpha_2$, $\alpha_3$, and thus the link from $S_2$ to $S_3$ is labeled with those atoms. Also, the rule $r_3$ serves to forward packets from switch $S_3$ to switch $S_4$ and affects addresses within the range covered by the atom $\alpha_3$, and thus the link from switch $S_3$ to switch $S_4$ is labeled only with atom $\alpha_3$.

FIGS. 4A-4D, among other purposes, serve to illustrate ownership of an atom, and the iterative modification of the representation upon the addition or insertion of a new rule. FIGS. 4A-4D are based on FIGS. 3A-3C, with the addition of a rule $r_4$.

Figure 4B:
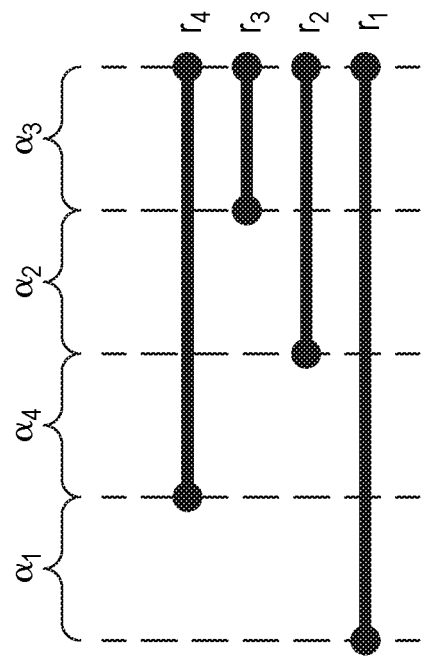
FIG. 4B depicts example intervals for various forwarding rules.
Figure 4A:
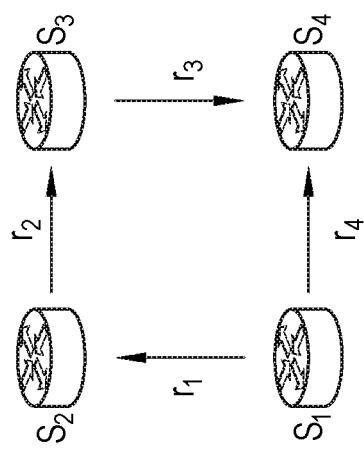
FIG. 4A depicts another example forwarding graph.

FIG. 4A depicts an example forwarding graph including switches $S_1$-$S_4$ and rules $r_1$-$r_4$. In this example, rule $r_4$ is a new rule inserted into the network, and rule $r_4$ has priority over rule $r_1$. The new rule $r_4$ may be operable at switch $S_1$ to route certain traffic to switch $S_4$. For example, a network administrator may designate that certain traffic is to be routed in a different direction. As another example, a link (not illustrated) may fail and break an existing pathway and the new rule may include a rerouting of that traffic. As another example, the rerouting may be based on a network optimization program running to load balance where traffic is routed. The priority of new rules may be determined by the network administrator adding the rule, the optimization process, or the fail-over process. For example, certain packets for a certain range may be identified as being malicious and a rule may be introduced (even temporarily) to drop all packets within an address range and may have a very high priority so that all packets except critical packets (e.g., those with even higher priority) are dropped.

FIG. 4B depicts ranges of addresses for rules $r_1$, $r_2$, $r_3$, and $r_4$. FIG. 4B depicts the rules in vertical order of priority with the top being the highest priority rule and the bottom being the lowest priority rule. As shown in FIG. 4B, the introduction of the rule $r_4$ introduces a new distinct range of addresses that does not have a corresponding atom depicted in FIGS. 3A-3C. Thus, the new atom $\alpha_4$ must be generated to cover the range of addresses that start at the beginning point of atom $\alpha_4$ and terminate at the starting point of atom $\alpha_2$. Additionally, the creation of the new atom effectively decreases the range of addresses covered by the atom $\alpha_1$. Such a process may be referred to as splitting atoms, as the atom $\alpha_1$ was turned into two atoms, atom $\alpha_1$ and atom $\alpha_4$. The address range for rule for rule $r_1$ includes atoms $\alpha_1$, $\alpha_2$, $\alpha_3$, and $\alpha_4$, the address range for rule $r_2$ includes atoms $\alpha_2$ and $\alpha_3$, the address range for rule $r_3$ includes atom $\alpha_3$, and the address range for rule $r_4$ includes atoms $\alpha_2$, $\alpha_3$, and $\alpha_4$.

In some embodiments, the owner of an atom may represent the rule that is designated as the highest priority rule for the atom for a given switch. Or in other words, the owner of an atom may be the rule that governs the forwarding behavior with respect to the numerical range of network addresses of the atom for a given switch.

As illustrated in FIG. 4B, the owner of the atom $\alpha_1$ may be the rule $r_1$ at the switch $S_1$, as the rule is the highest priority rule for that particular range of addresses potentially covered by the rule $r_1$. Furthermore, the rule $r_1$ would be the owner for the address ranges covered by the new atom $\alpha_2$, $\alpha_3$, and $\alpha_4$ in FIGS. 3A-3C. However, the new rule $r_4$ and the creation of the atom $\alpha_4$ show that the rule $r_4$ has a higher priority than the rule $r_1$ at switch $S_1$ for those atoms, so the new rule $r_4$ would be the owner of the new atom $\alpha_4$ as well as the atoms $\alpha_2$ and $\alpha_3$.

Figure 4D:
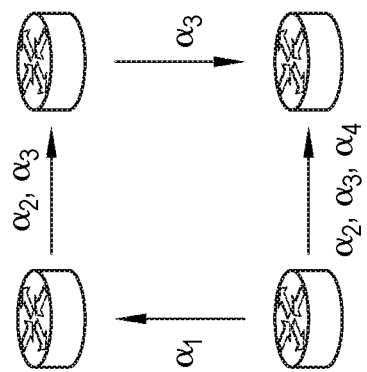
FIG. 4D depicts yet another example edge-labeled graph.
Figure 4C:
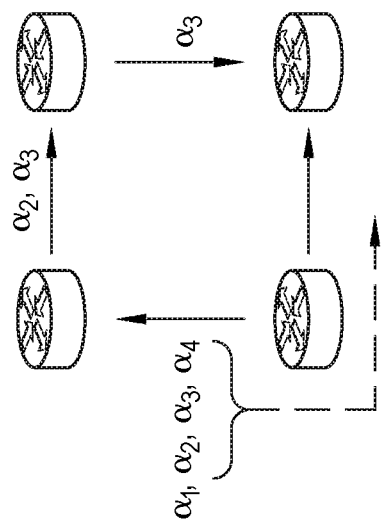
FIG. 4C illustrates another example edge-labeled graph.

FIG. 4C illustrates a single edge-labeled graph, wherein atoms $\alpha_1$, $\alpha_2$, $\alpha_3$ represent an interval for rule $r_1$, atoms $\alpha_2$ and $\alpha_3$ represent an interval for rule $r_2$, and atom $\alpha_3$ represents an interval for rule $r_3$. Further, according to various embodiments, the edge-labeled graph of FIG. 4C may be transformed in response to rule $r_4$ being added to the network. For example, as described above, the ownership information for the atoms $\alpha_2$, $\alpha_3$, and $\alpha_4$ may be the new rule $r_4$. In these and other embodiments, the atoms will be reassigned to the link of the new rule (the link from switch $S_1$ to switch $S_4$) as illustrated in the dashed arrow.

FIG. 4D depicts an edge-labeled graph which is transformed from the edge-labeled graph of FIG. 4C. It is noted that the graph transformation may avoid construction of multiple overlapping forwarding graphs by transforming a single edge-labeled graph.

Incrementally maintaining atoms may include various advantages. First, since there tends to be fewer atoms than rules in a network, atoms may effectively compress information on how packets flow in the network. Second, atoms may allow a system to efficiently infer which rules are affected by the removal and/or insertion of a rule. More specifically, in the example described with reference to FIGS. 4A-4D, only rules $r_1$ and $r_4$ on switch $S_1$ need to be inspected to transform the edge-labeled graph, rather than all rules as in conventional systems, which construct multiple forwarding graphs.

Figure 5:
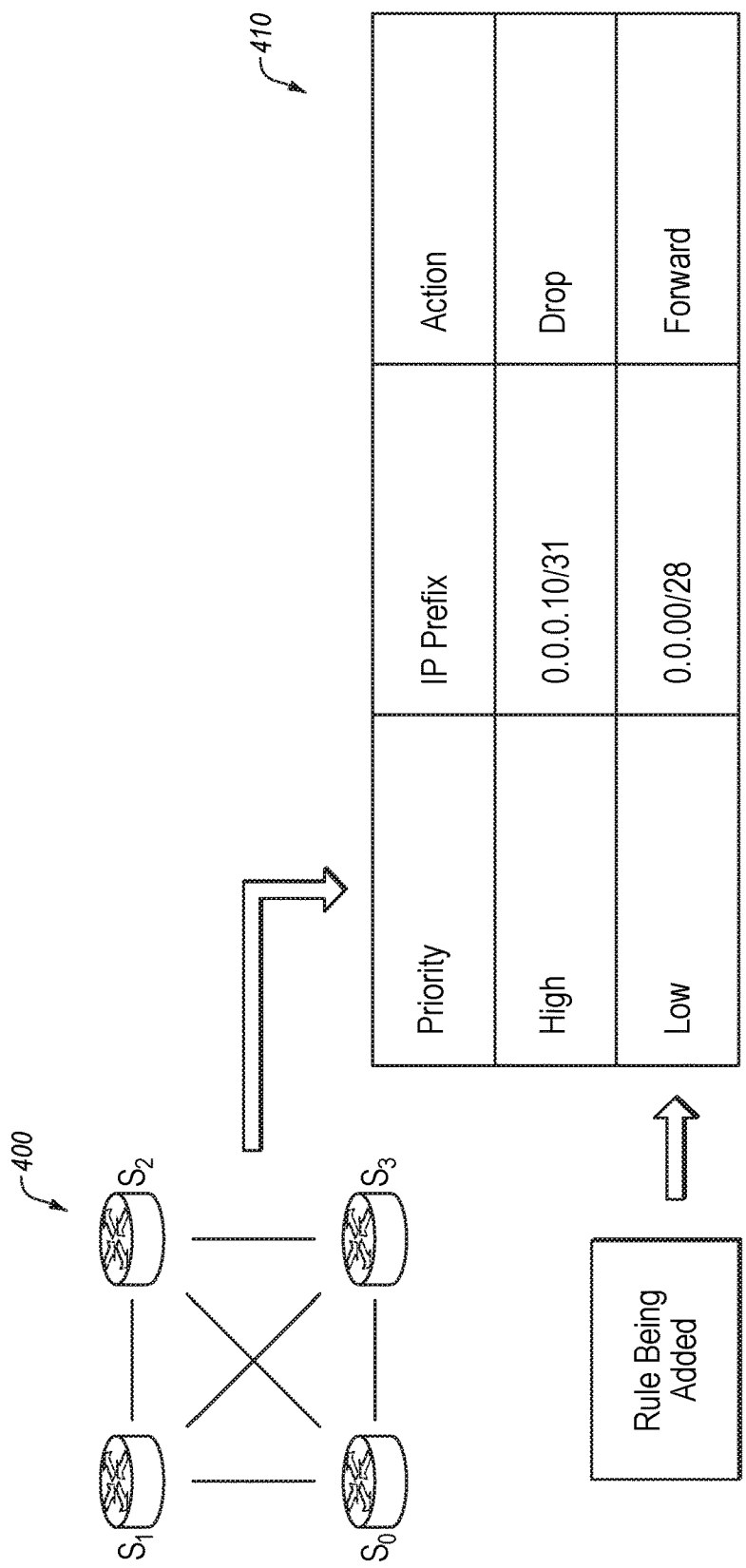
FIG. 5 illustrates a network topology and a forwarding table.

FIG. 5 depicts a network topology 400 and a forwarding table 410 for a network switch. Forwarding table 410 includes entries for two rules, rule $r_H$ having a high priority and rule $r_L$ having a low priority. Rule $r_H$ drops packets whose destination address matches the IP prefix "0.0.0.10/31" (using the IPv4 CIDR format, although IPv6 addresses and address ranges are contemplated by the present disclosure), and rule, $r_L$ forwards packets destined to the IP prefix "0.0.0.0/28."

As noted above, IP prefixes may be considered as intervals, and more specifically half-closed intervals. For example, an IP prefix of rule $r_H$ corresponds to a half-closed interval [10: 12) because the IP prefix "0.0.0.10/31" is equivalent to the 32-bit sequence that starts with all zeros and ends with 101* where * denotes an arbitrary bit. The short-hand notation of [10: 12) indicates that the last byte can only represent the $10^{th}$ or $11^{th}$ possible Boolean combination of varying the last 4 bits, and the $1-9^{th}$ and $12-16^{th}$ possible Boolean combinations are outside of the range of addresses covered by the IPR prefix. Similarly, the IP prefix "0.0.0.0/28"=[0: 16) since 0.0.0.0/28=0 . . . 0****, meaning the IP prefix covers all 16 possible Boolean combinations of varying the last four bits between 0 and 1.

As described above, the IP prefixes of all the rules in the network may be dissected into disjoint half-closed intervals, or into a set of one or more atoms that cover the range of network addresses covered by the IP prefix. With reference to FIG. 6, and rules $r_H$ and $r_L$, each of the resulting half-closed intervals may be referred to as an "atom" because each atom induces a Boolean lattice, as illustrated by a Hasse diagram 500 in FIG. 7. In Hasse diagram 500, atoms [0: 10), [10: 12), and [12: 16) correspond to atoms $\alpha_0$, $\alpha_1$ and $\alpha_2$ in FIG. 6, respectively.

By construction of atoms, an IP prefix of a rule r may be represented as a set of atoms one or more. An IP prefix representation may be denoted by interval(r), representing the range of addresses affected by rule r. For example, an IP prefix for rule $r_H$ is interval($r_H$) and may correspond to a singleton set including the range of addresses corresponding to atom $\alpha_1$, whereas an IP prefix for rule $r_L$ is interval($r_L$) and may correspond to the range of addresses corresponding to the combination of atoms $\alpha_0$, $\alpha_1$, and $\alpha_2$. Using these atoms, the set difference [interval($r_L$)–interval($r_H$)] may be used to describe that the IP prefix of rule $r_L$ may only match packets that are not dropped by the higher-priority rule $r_H$. Stated another way, because rule $r_H$ is a higher priority rule, the packets that fall within the range of addresses designated by the IP prefix associated with $r_H$ will be dropped, while the packets that are within the range identified by rule $r_L$ and outside of the set $r_H$ will be handled according to rule $r_L$.

According to various embodiments, a plurality of data plane snapshots of a control plane of a network may be captured. Further, based on the plurality of data plane snapshots, one or more network properties may be determined. More specifically, based on the plurality of data plane snapshots, at least one invariant reachability property may be determined. For example, FIG. 8 illustrates an example control plane 600, a plurality of example data plane snapshots 602_1-602_N, and an example property 604. In this example, data plane snapshots 602_1-602_N, which may also be referred to herein as "stable data plane snapshots" may be captured over time. For example, each snapshot may be generated in response to a modification of a network (e.g., addition or removal of a forwarding rule). Further, based on data plane snapshots 602_1-602_N, property 604, which may include at least one invariant reachability property, may be determined.

Figure 9A:
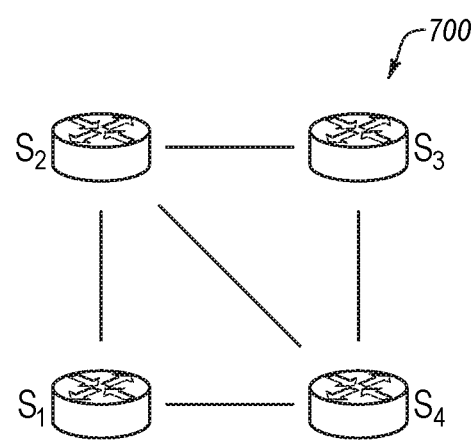
FIG. 9A illustrates a network topology.
Figure 9B:
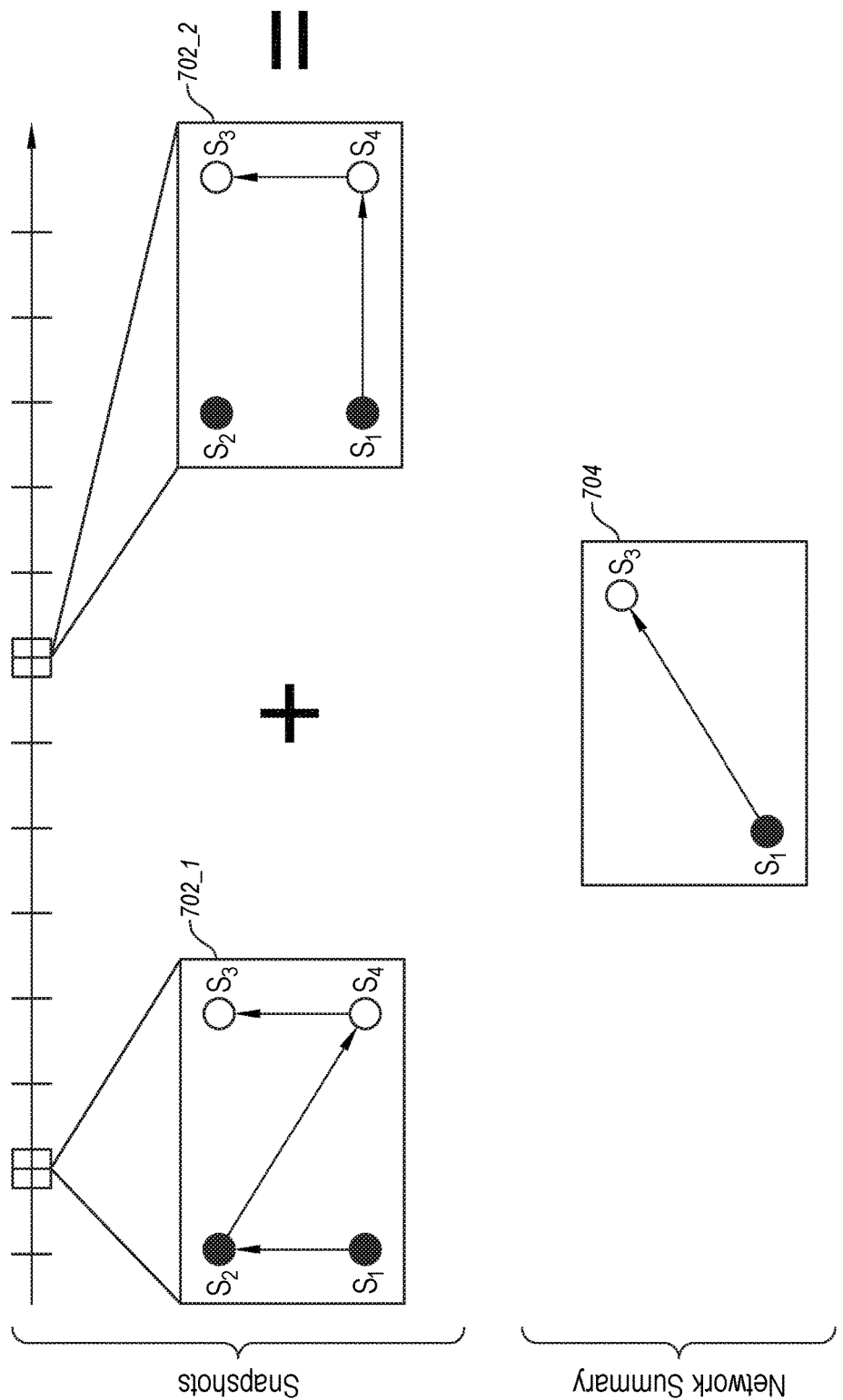
FIG. 9B depicts a plurality of data plane snapshots and a network summary.

FIG. 9A illustrates an example network topology 700 including a plurality of switches $S_1$-$S_4$. FIG. 9B illustrates a plurality of example data plane snapshots 702_1 and 702_2, and an example network summary 704, wherein each of data plane snapshots 702_1 and 702_2 and network summary 704 maybe associated with network topology 700. According to some embodiments, data plane snapshots 702_1 and 702_2 may include data plane snapshots of an IP prefix P, and network summary 704 may include a network summary of the IP prefix P. In this example, data plane snapshots 702_1 illustrates that a network packet may flow from switch $S_1$ to switch $S_2$, from switch $S_2$ to switch $S_4$, and from switch $S_4$ to switch $S_3$. Further, data plane snapshots 702_2 illustrates that a network packet may flow from switch $S_1$ to switch $S_4$, and from switch $S_4$ to switch $S_3$. In each of data plane snapshots 702_1 and 702_2, a network packet originates at switch $S_1$ and arrives at switch $S_3$. Accordingly, in this example, based on data plane snapshots 702_1 and 702_2, network summary 704 depicts a network invariant (e.g., a network packet originates at switch $S_1$ and arrives at switch $S_3$) given data plane snapshots 702_1 and 702_2. It is noted that it is not required that a physical link exists between switch $S_1$ and switch $S_3$. Rather, a network summary (e.g., network summary 704) may represent a summary of overall network behavior and/or an intent of the network.

Figure 10:
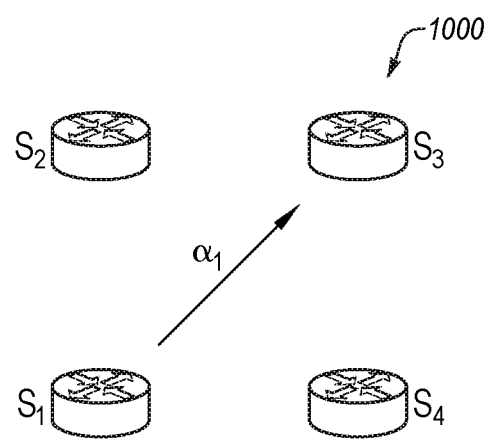
FIG. 10 depicts a summary graph.

Continuing with the example of FIGS. 9A and 9B, if the prefix P is the only IP prefix in the network, a summary graph 1000, which is shown in FIG. 10, may be determined. As depicted in FIG. 10, a link from switch $S_1$ to switch $S_3$ includes an atom $\alpha_1$.

Figure 11:
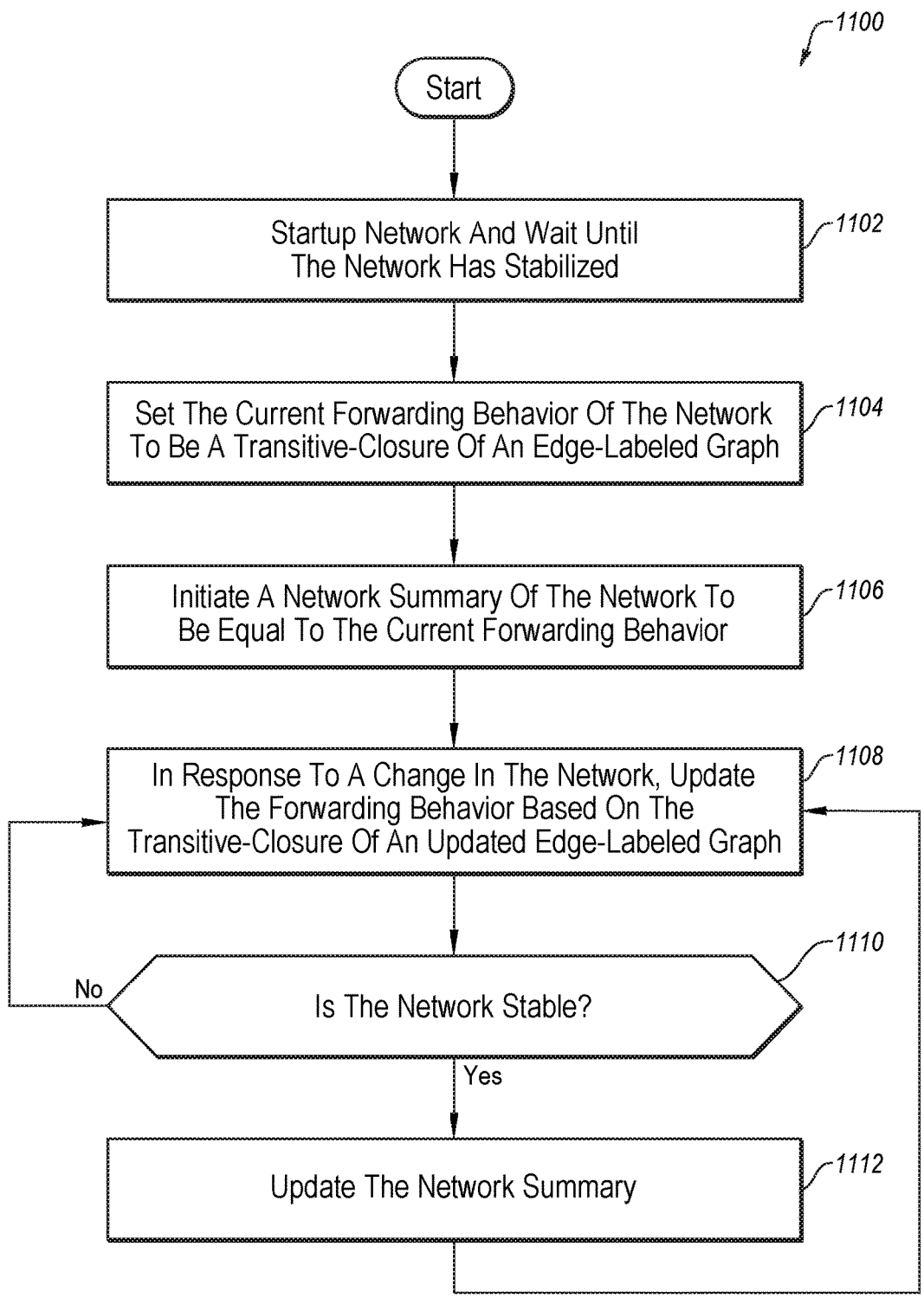
FIG. 11 is a flowchart of an example method for analyzing a network.

FIG. 11 is a flowchart of an example method 1100 of analyzing a network, in accordance with at least one embodiment of the present disclosure. In some embodiments, analyzing the network may include generating a network summary of the network. Method 1100 may be performed by any suitable system, apparatus, or device. For example, SDN controller 104 of FIG. 1, system 1400 of FIG. 14, or one or more of the components thereof may perform one or more of the operations associated with method 1100. In these and other embodiments, program instructions stored on a computer readable medium may be executed to perform one or more of the operations of method 1100. Further, each act of method 1100 may be static or dynamic, and may be performed online (e.g., in real-time), or offline. Further, each act may be performed incrementally or non-incrementally.

At block 1102, a network may be initialized, and method 1100 may proceed to block 1104. Further, for example, after the network is initialized, a sufficient amount of time may pass to enable the network to stabilize (e.g., the network has not changed for a predetermined time period). For example, processor 1410 of system 1400 (see FIG. 14) may initialize the network.

At block 1104, a current forwarding behavior of the network may be set as a transitive closure of an edge-labeled graph of the network, and method 1100 may proceed to block 1106. More specifically, for example, a data plane for routing traffic through a network that includes one or more forwarding tables for each switch of a plurality of switches in the data plane may be identified. Further, an edge-labeled graph (e.g., forwarding behavior representation) may be generated, wherein each edge of the edge-labeled graph may be associated with one or more atoms to represent an Internet Protocol (IP) prefix of a forwarding rule of the data plane. Moreover, the network summary may be initialized as a transitive closure of the edge-labeled graph. For example, processor 1410 of system 1400 (see FIG. 14) may initialize the network summary of the network as a transitive closure.

At block 1106, a network summary of the network may be initiated to be equal to current forwarding behavior, and method 1100 may proceed to block 1108. According to some embodiments, for example, the forwarding behavior of the network may be set equal to the network summary. For example, processor 1410 of system 1400 (see FIG. 14) may determine the forwarding behavior of the network.

At block 1108, in response to a change in the network, the forwarding behavior of the network may be updated based on the transitive closure of an updated edge-labeled graph, and method 1100 may proceed to block 1110. In some embodiments, for example, the edge-labeled graph may be updated to generate an updated edge-labeled graph in response to a modification of a forwarding table of one or more forwarding tables. Further, a transitive closure of the updated forwarding behavior may be generated. For example, in response to a rule being either added to or removed from the network, the forwarding behavior of the network may be updated, and a transitive closure of the updated forwarding behavior may be determined. For example, processor 1410 of system 1400 (see FIG. 14) may update forwarding behavior of the network and determined the transitive closure the updated forwarding behavior.

At block 1110, a determination may be made as to whether the network is stable. According to some embodiments, any user-defined criteria may be used to determine stability. As one example, if the network has not changed (e.g., a rule has not been added or removed) within a time period (e.g., a predetermined and/or selectable time period), it may be determined that the network is stable. For example, processor 1410 of system 1400 (see FIG. 14) may determine whether or not the network is stable. If it is determined that the network is stable, method 1100 may proceed to block 1112. If it is determined that the network is not stable (e.g., a rule has been added or deleted within a time period), method 1110 may return to block 1108.

At block 1112, the network summary may be updated. In some embodiments, for example, the network summary may be updated based on the network summary and the transitive closure of the updated edge-labeled graph. For example, the network summary may be updated as an intersection of the previous network summary and the current forwarding behavior. Stated another way, the network summary may be updated to include all transitive edges that have been present in all previously captured data plane snapshots. For example, with reference to FIG. 9B, the transitive edge from switch $S_1$ to switch $S_3$ exits in each of data plane snapshot 702_1 and data plane snap shot 702_2. Thus, in this example, network summary 704 (e.g., a summary of overall network behavior or an intent of the network) includes a link from switch $S_1$ to switch $S_3$. For example, processor 1410 of system 1400 (see FIG. 14) may update the network summary.

Modifications, additions, or omissions may be made to method 1100 without departing from the scope of the present disclosure. For example, the operations of method 1100 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 12B:
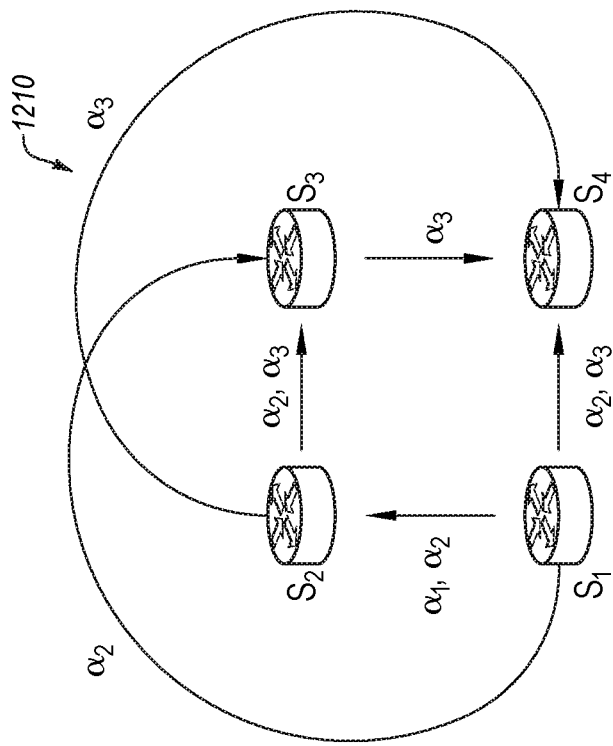
FIG. 12B depicts a transitive closure of the edge-labeled graph of FIG. 12A.
Figure 12A:
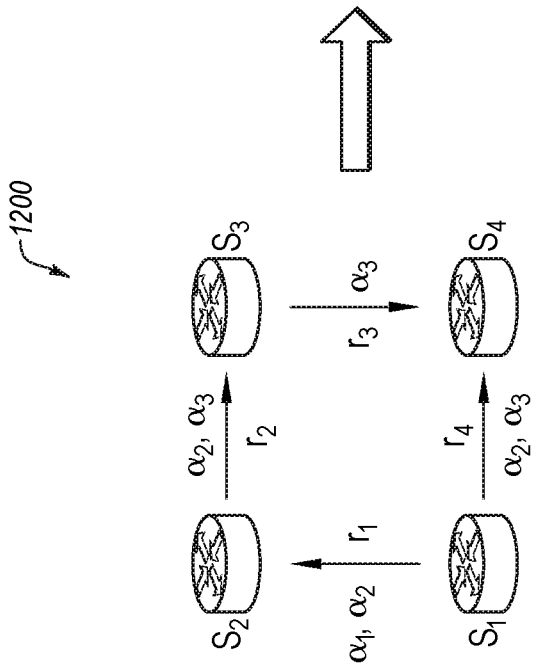
FIG. 12A illustrates an edge-labeled graph.

FIG. 12A depicts a single edge-labeled graph 1200, which may be a visual example of the forwarding rule representation within the network. For example, a rule $r_1$ serves to forward packets from switch $S_1$ to switch $S_2$ and affects addresses within the range covered by the atoms $\alpha_1$, $\alpha_2$, and thus the link from switch $S_1$ to switch $S_2$ is labeled with those two atoms affected by the rule. Additionally, a rule $r_2$ serves to forward packets from switch $S_2$ to switch $S_3$ and affects addresses within the range covered by the atoms $\alpha_2$, $\alpha_3$, and thus the link from switch $S_2$ to switch $S_3$ is labeled with those atoms. Also, a rule $r_3$ serves to forward packets from switch $S_3$ to switch $S_4$ and affects addresses within the range covered by the atom $\alpha_3$, and thus the link from switch $S_3$ to switch $S_4$ is labeled only with atom $\alpha_3$. Further, a rule $r_4$ serves to forward packets from switch $S_1$ to switch $S_4$ and affects addresses within the range covered by the atoms $\alpha_1$, $\alpha_2$, and thus the link from switch $S_1$ to switch $S_4$ is labeled with those two atoms affected by the rule.

According to various embodiments, a transitive closure of edge-labeled graph may be determined via any suitable process. More specifically, for example, a depth-first search (DFS) algorithm may be used to compute the transitive closure of a graph whose edges are labeled by atoms. Further, for example, a DFS algorithm may be run per affected atom on a subgraph induced by the union of all edges that are labeled with an atom FIG. 12B depicts a transitive closure 1210 of single edge-labeled graph 1200 of FIG. 12A. A link from switch $S_1$ to switch $S_3$ is labeled transitively with atom $\alpha_2$ (e.g., there is a path from switch $S_1$ to switch $S_3$ in which all the links in the path are labeled with atom $\alpha_2$, namely the path from switch $S_1$ to switch $S_3$ through switch $S_2$), and a link from switch $S_2$ to switch $S_4$ is labeled transitively with atom $\alpha_3$ (e.g., there is a path from switch $S_2$ to switch $S_4$ in which all the links in the path are labeled with atom $\alpha_3$, namely the path from switch $S_2$ to switch $S_4$ through switch $S_3$).

FIGS. 13A-13D depict simulation results for an example network (e.g., via a border gateway protocol (BGP) network simulation). More specifically, as illustrated in FIG. 13A, a network summary in form of an adjacency matrix 1302 and an associated graph visualization 1300 are illustrated for a converged state (e.g., converged state #8). For simplicity of the visualization, some transitive edges present in adjacency matrix 1302 are not shown in the graph (e.g., the edge from node 0 to node 6 is not drawn because the edge from node 0 to node 1 and the edge from node 1 to node 6 are present). As illustrated in FIG. 13B, an adjacency matrix 1312 and an associated graph visualization 1310 are illustrated for a subsequent converged state (e.g., converged state #26). Further, as illustrated in FIG. 13C, an adjacency matrix 1322 and an associated graph visualization 1320 are illustrated for a subsequent converged state (e.g., converged state #40). Moreover, as illustrated in FIG. 13D, an adjacency matrix 1332 and an associated graph visualization 1330 are illustrated for a subsequent converged state (e.g., converged state #52).

As depicted in FIGS. 13A-13D, the network summaries are increasingly simplified moving from FIG. 13A to FIG. 13D (e.g., from converged state #8 to converged state #26, from converged state #26 to converged state #40, and from converged state #40 to converged state #52). In this example, adjacency matrix 1332 and/or its graph visualization 1330 of FIG. 13D may be indicative of an intent of the network.

FIG. 14 is a block diagram of an example computing system 1400, in accordance with at least one embodiment of the present disclosure. Computing system 1400 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing system 1400 may include a processor 1410, a storage device 1420, a memory 1430, and a communication device 1440. Processor 1410, storage device 1420, memory 1430, and/or communication device 1440 may all be communicatively coupled such that each of the components may communicate with the other components. Computing system 1400 may perform any of the operations described in the present disclosure.

In general, processor 1410 may include any suitable special-purpose or general-purpose computer, computing entity, or processing device including various computer hardware or software modules and may be configured to execute instructions stored on any applicable computer-readable storage media. For example, processor 1410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 14, processor 1410 may include any number of processors configured to perform, individually or collectively, any number of operations described in the present disclosure.

In some embodiments, processor 1410 may interpret and/or execute program instructions and/or process data stored in storage device 1420, memory 1430, or storage device 1420 and memory 1430. In some embodiments, processor 1410 may fetch program instructions from storage device 1420 and load the program instructions in memory 1430. After the program instructions are loaded into memory 1430, processor 1410 may execute the program instructions.

For example, in some embodiments, one or more of the processing operations for network verification may be included in data storage 1420 as program instructions. Processor 1410 may fetch the program instructions of one or more of the processing operations and may load the program instructions of the processing operations in memory 1430. After the program instructions of the processing operations are loaded into memory 1430, processor 1410 may execute the program instructions such that computing system 1400 may implement the operations associated with the processing operations as directed by the program instructions.

Storage device 1420 and memory 1430 may include computer-readable storage media for carrying or having computer-executable instructions or data structures stored thereon. Such computer-readable storage media may include any available media that may be accessed by a general-purpose or special-purpose computer, such as processor 1410. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1410 to perform a certain operation or group of operations.

In some embodiments, storage device 1420 and/or memory 1430 may store data associated with network analysis. For example, storage device 1420 and/or memory 1430 may store properties, data planes, network applications, forwarding tables, forwarding rules, forwarding behavior representations, ownership information, network summaries, and graphs (e.g., edge-labeled graphs and/or transitive closures).

Communication device 1440 may include any device, system, component, or collection of components configured to allow or facilitate communication between computing system 1400 and another electronic device. For example, communication device 1440 may include, without limitation, a modem, a network card (wireless or wired), an infrared communication device, an optical communication device, a wireless communication device (such as an antenna), and/or chipset (such as a Bluetooth device, an 802.6 device (e.g., Metropolitan Area Network (MAN)), a Wi-Fi device, a WiMAX device, cellular communication facilities, etc.), and/or the like. Communication device 940 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 14 without departing from the scope of the present disclosure. For example, computing device 1400 may include more or fewer elements than those illustrated and described in the present disclosure. For example, computing system 1400 may include an integrated display device such as a screen of a tablet or mobile phone or may include an external monitor, a projector, a television, or other suitable display device that may be separate from and communicatively coupled to computing system 1400.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A network analysis method, comprising:
   identifying a data plane for routing traffic through a network that includes one or more forwarding tables for each switch of a plurality of switches in the data plane;
   generating an edge-labeled graph, wherein each edge of the edge-labeled graph is associated with one or more atoms to represent an Internet Protocol (IP) prefix of a forwarding rule of the data plane;
   initializing a network summary of the network as a transitive closure of the edge-labeled graph;
   updating the edge-labeled graph to generate an updated edge-labeled graph in response to a modification of a forwarding table of the one or more forwarding tables;
   determining a transitive closure of the updated edge-labeled graph; and
   updating the network summary based on the network summary and the transitive closure of the updated edge-labeled graph.

2. The method of claim 1, further comprising identifying an updated data plane in response to the modification of the forwarding table.

3. The method of claim 2, wherein updating the edge-labeled graph comprises updating the edge-labeled graph in response to the updated data plane.

4. The method of claim 1, wherein updating the edge-labeled graph to generate an updated edge-labeled graph in response to modification of the forwarding table comprises updating the edge-labeled graph to generate an updated edge-labeled graph in response to one of a forwarding rule being removed from the forwarding table and a forwarding rule being added to the forwarding table.

5. The method of claim 1, further comprising comparing the updated network summary to one or more predefined network properties to detect one or more errors in the updated network summary.

6. The method of claim 1, further comprising identifying at least one invariant property of the network based on the updated network summary.

7. The method of claim 6, further comprising identifying an intent of the network based on the at least one invariant property.

8. The method of claim 1, further comprising determining whether the network is stable.

9. The method of claim 8, wherein updating the network summary comprises updating the network summary in response to determining that the network is stable.

10. The method of claim 1, wherein updating the network summary comprises updating the network summary as an intersection of the network summary and a current forwarding behavior of the network.

11. One or more non-transitory computer-readable media that include instructions that, in response to being executed by one or more processors, are configured to cause a system to perform operations, the operations comprising:
  identifying a data plane for routing traffic through a network that includes one or more forwarding tables for each switch of a plurality of switches in the data plane;
  generating an edge-labeled graph, wherein each edge of the edge-labeled graph is associated with one or more atoms to represent an Internet Protocol (IP) prefix of a forwarding rule of the data plane;
  initializing a network summary of the network as a transitive closure of the edge-labeled graph;
  updating the edge-labeled graph to generate an updated edge-labeled graph in response to a modification of a forwarding table of the one or more forwarding tables;
  determining a transitive closure of the updated edge-labeled graph; and
  updating the network summary based on the network summary and the transitive closure of the updated edge-labeled graph.

12. The computer-readable media of claim 11, the operations further comprising identifying an updated data plane in response to the modification of the forwarding table.

13. The computer-readable media of claim 12, wherein updating the edge-labeled graph comprises updating the edge-labeled graph in response to the updated data plane.

14. The computer-readable media of claim 11, wherein updating the edge-labeled graph to generate an updated edge-labeled graph in response to modification of the forwarding table comprises updating the edge-labeled graph to generate an updated edge-labeled graph in response to one of a forwarding rule being removed from the forwarding table and a forwarding rule being added to the forwarding table.

15. The computer-readable media of claim 11, the operations further comprising comparing the updated network summary to one or more predefined network properties to detect one or more errors in the updated network summary.

16. The computer-readable media of claim 11, the operations further comprising identifying at least one invariant property of the network based on the updated network summary.

17. The computer-readable media of claim 16, the operations further comprising identifying an intent of the network based on the at least one invariant property.

18. The computer-readable media of claim 11, the operations further comprising determining whether the network is stable.

19. The computer-readable media of claim 18, wherein updating the network summary comprises updating the network summary in response to determining that the network is stable.

20. The computer-readable media of claim 11, wherein updating the network summary comprises updating the network summary as an intersection of the network summary and a current forwarding behavior of the network.

* * * * *